United States Patent [19]

Withrow

[11] Patent Number: 5,191,733
[45] Date of Patent: Mar. 9, 1993

[54] MOLE SPEAR

[76] Inventor: Virdean N. Withrow, R.R. #1, Box 57, Granville, Ill. 61326

[21] Appl. No.: 872,689

[22] Filed: Apr. 20, 1992

[51] Int. Cl.$^5$ .......................................... A01M 23/30
[52] U.S. Cl. ........................................................ 43/124
[58] Field of Search ....................... 43/124, 77, 78, 79, 43/80, 6

[56] References Cited

U.S. PATENT DOCUMENTS

| 119,354 | 9/1871 | Hardwick | 43/80 |
| 146,003 | 12/1873 | Huggins | 43/80 |
| 393,048 | 11/1888 | Wherry | 43/80 |
| 563,682 | 7/1896 | Parker | 43/80 |
| 1,297,344 | 3/1919 | Glan | 43/79 |
| 1,913,594 | 6/1933 | Hoffman | 43/80 |
| 1,965,177 | 7/1934 | Finkl | 43/124 |
| 2,020,571 | 11/1935 | Nich | 43/124 |

Primary Examiner—Richard K. Seidel
Assistant Examiner—James Miner
Attorney, Agent, or Firm—Richard L. Miller

[57] ABSTRACT

A mole spear is provided which consists of an elongated shaft attached to and extending upwardly from the center of a base member. A sleeve slides upon the elongated shaft and is gripped by a first hand of a person. A handle is affixed to an upper end of the elongated shaft and is gripped by a second hand of the person. A plurality of spikes are attached to and extend downwardly from the base member. The second hand of the person can press down upon the handle to drive the elongated shaft through the sleeve to force the spikes into a mole tunnel beneath a raised surface of the earth and pierce a mole therein to kill it.

2 Claims, 1 Drawing Sheet

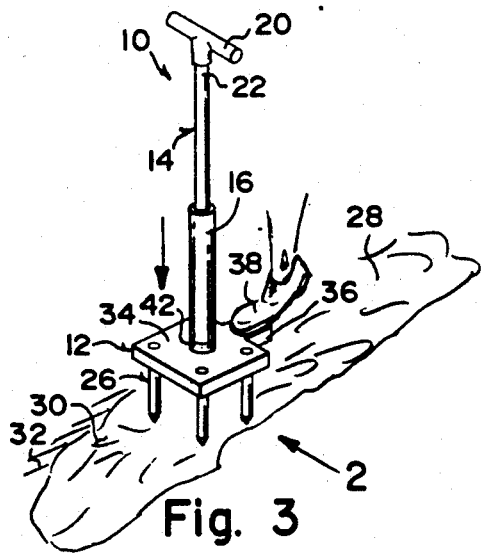
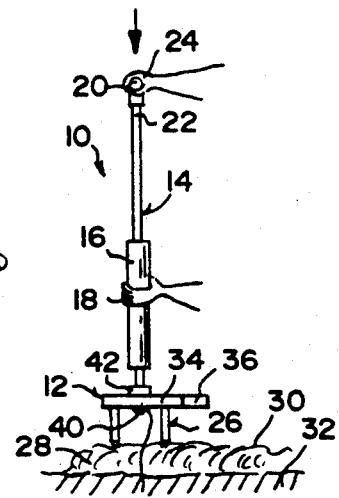
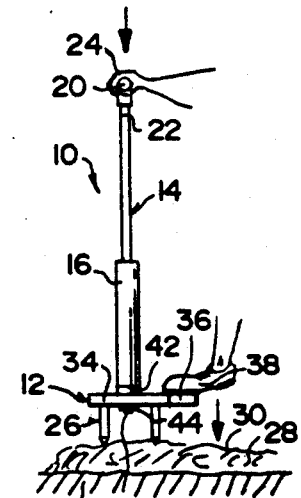
Fig. 3  Fig. 1  Fig. 2
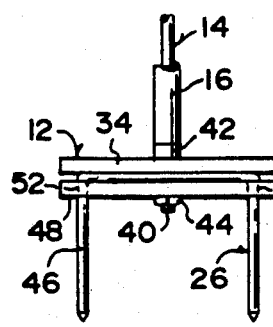
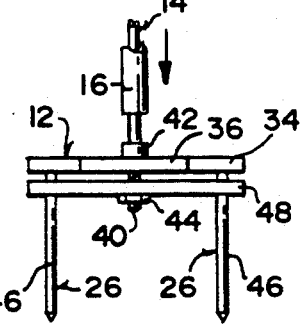
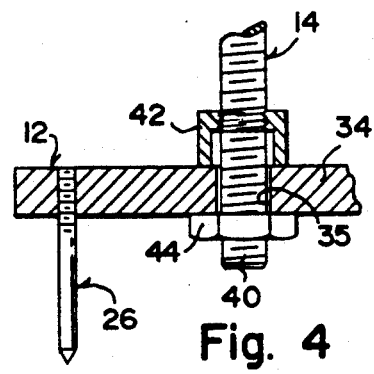
Fig. 5  Fig. 6  Fig. 4
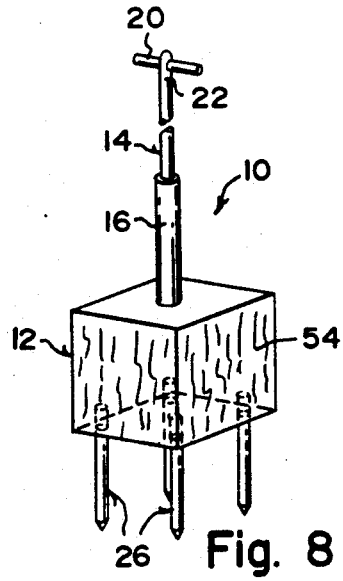
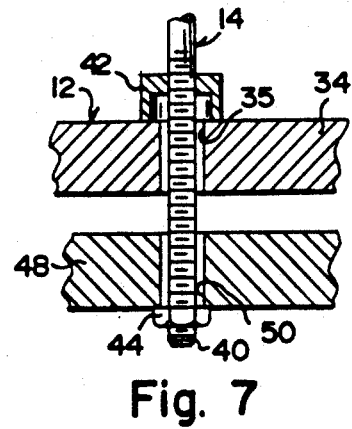
Fig. 8  Fig. 7

MOLE SPEAR

BACKGROUND OF THE INVENTION

The instant invention relates generally to animal traps but more specifically it relates to a mole spear.

Numerous animal traps have been provided in the prior art that are adapted to catch and kill animals in their raised tunnels beneath the surface of the earth. For example, U.S. Pat. Nos. 4,494,335 to Gaines; 4,538,375 to Kelley and 4,776,128 to Townsend all are illustrative of such prior art. While these units may be suitable for the particular purpose to which they address, they would not be as suitable for the purpose of the present invention as hereafter described.

SUMMARY OF THE INVENTION

A primary object of the present invention is to provide a mole spear that will overcome the shortcomings of the prior art devices.

Another object is to provide a mole spear that is utilized to force spikes into a mole tunnel beneath a raised surface of the earth, so that the spikes can pierce a mole to kill it.

An additional object is to provide a mole spear that is completely controlled manually by a person standing over the raised surface of the earth of the mole tunnel to prevent the spikes from causing accidental injury to other animals and people.

A further object is to provide a mole spear that is simple and easy to use.

A still further object is to provide a mole spear that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWINGS FIGURES

The figures in the drawings are briefly described as follows:

FIG. 1 is a diagrammatic elevational view illustrating a first embodiment of the instant invention in use;

FIG. 2 is a diagrammatic elevational view illustrating an additional step for further forcing the mole spear into the earth;

FIG. 3 is a diagrammatic perspective view showing the first embodiment of the instant invention positioned and ready for a downward thrust into the earth;

FIG. 4 is an enlarged partial sectional view showing the first embodiment construction thereof;

FIG. 5 is a partial side elevational view showing a second embodiment construction thereof;

FIG. 6 is a view taken in the direction of arrow 6 in FIG. 5;

FIG. 7 is an enlarged partial cross sectional better illustrating the clamping mechanism shown in FIGS. 5 and 6; and FIG. 8 is a diagrammatic perspective view of a third embodiment of the instant invention.

DETAILED DESCRIPTION OF THE PREFERRED EMBODIMENTS

Turning now descriptively to the drawings, in which similar reference characters denote similar elements throughout the several views, the Figures illustrate a mole spear 10 which consists of a base member 12 and an elongated shaft 14 attached to an extending upwardly from the center of the base member 12. A sleeve 16 slides upon the elongated shaft 14, in which the sleeve 16 is gripped by a first hand 18 of a person. A handle 20 is affixed to an upper end 22 of the elongated shaft 14, in which the handle 20 is gripped by a second hand 24 of the person. A plurality of spikes 26 are attached to and extend downwardly from the base member 12. The second hand 24 of the person can press down upon the handle 20 to drive the elongated shaft 14 through the sleeve 16 to force the spike 26 into a mole tunnel 28 beneath a raised surface 30 of the earth 32 and pierce a mole therein to kill it.

The base member 12, as shown in FIGS. 1 through 4, is a plate 34 having a central aperture 35 with a foot step 36 extending outwardly from one side of the plate 34. A foot 38 of the person can engage with the foot step 36 to further force the spikes 26 into the mole tunnel 28. The elongated shaft 14 has a threaded lower end 40. A retainer cap 42 is threaded onto the threaded lower end 40 of the elongated shaft 14, before the threaded lower end 40 is inserted through the central aperture 35 in the plate 36. A nut 44 is threaded onto the threaded lower end 40 of the elongated shaft 14 after the threaded lower end 40 is inserted through the central aperture 35 in the plate 34. The elongated shaft 14 will now be secured to the plate 34.

As shown in FIGS. 5 through 7, the spikes 26 are a pair of U-shaped double spikes 46. A second plate 48 is provided, having a central aperture 50 and a plurality of holes 52, each located at one corner of the second plate 48, the second plate 48 is positioned aligned under the first plate 34, with each U-shaped double spike 46 extending through two of the cover holes 52 and sandwiched between the first plate 34 and the second plate 48. The threaded lower end 40 of the elongated shaft 14 will extend through the first central aperture 35 in the first plate 34 and the second central aperture 50 in the second plate 48 with the nut 44 threaded thereon to secure the elongated shaft 14 and the U-shaped double spikes 46 thereto.

In FIG. 8 the base member 12 is a weighted block 54, so that when the second hand 24 of the person presses down upon the handle 20 to drive the elongated shaft 14 through the sleeve 16, the weighted block 54 will help force the spikes 26 into the mole tunnel 28.

To use the mole spear 10 the following steps should be taken:

1. Grip the sleeve 16 with the first hand 18.
2. Grip the handle 20 with the second hand 24.
3. Position the spikes 26 over the forward end of the mole tunnel 28.
4. Press down upon the handle 20 to force the spikes 26 into the mole tunnel 28 to kill the mole.
5. Step on the foot step 36 with the foot 38 to further force the spikes 26 into the mole tunnel 28 to make sure the mole is killed.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A mole spear which comprises:
   a) a base member said base member being a plate having a central aperture with a foot step extending outwardly from one side of said plate, so that a foot of the person can engage with a foot step to further force a plurality of spikes into a mole tunnel;
   b) an elongated shaft attached to and extending upwardly from the center of said base member wherein said elongated shaft has a threaded lower end;
   c) a sleeve that slides upon said elongated shaft, in which said sleeve is gripped by a first hand of a person;
   d) a handle affixed to an upper end of said elongated shaft, in which said handle is gripped by a second hand of the person;
   e) said plurality of spikes attached to and extending downwardly from said base member, so that the second hand of the person can press down upon said handle to drive said elongated shaft through said sleeve to force said spikes into a mole tunnel beneath a raised surface of the earth and pierce a mole therein to kill it
   said spikes being a pair of U-shaped double spikes;
   f) a retainer cap threaded onto said threaded lower end of said elongated shaft, before said threaded lower end is inserted through said central aperture in said plate;
   g) a nut threaded onto said threaded lower end of said elongated shaft after said threaded lower end is inserted through said central aperture in said plate, so that said elongated shaft will be secured to said plate; and
   h) a second plate having a central aperture, and a plurality of holes, each located at one corner of said second plate, said second plate positioned aligned under said first plate, with each said U-shaped double spike extending through two of said corner holes and sandwiched between said first plate and said second plate, so that said threaded lower end of said elongated shaft will extend through said first central aperture in said first plate and said second central aperture in said second plate with said nut threaded thereon to secure said elongated shaft and said U-shaped double spikes thereto.

2. A mole spear as recited in claim 1, where said base member is a weighted block, so that when the second hand of the person presses down upon said handle to drive said elongated shaft through said sleeve, said weighted block will help force said spikes into the mole tunnel.

* * * * *